United States Patent
Paulus, Jr. et al.

(10) Patent No.: US 9,936,187 B2
(45) Date of Patent: Apr. 3, 2018

(54) MULTI-RESOLUTION LIGHTFIELD RENDERING USING IMAGE PYRAMIDS

(71) Applicant: Siemens Healthcare GmbH, Erlangen (DE)

(72) Inventors: John Paulus, Jr., East Windsor, NJ (US); Christoph Vetter, East Windsor, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 211 days.

(21) Appl. No.: 15/158,222

(22) Filed: May 18, 2016

(65) Prior Publication Data

US 2017/0339394 A1   Nov. 23, 2017

(51) Int. Cl.
    *H04N 13/02*    (2006.01)
    *G06F 3/0482*   (2013.01)
    *G06F 3/0484*   (2013.01)
    *G06T 15/06*    (2011.01)

(52) U.S. Cl.
    CPC ....... *H04N 13/0207* (2013.01); *G06F 3/0482* (2013.01); *G06F 3/04845* (2013.01); *G06T 15/06* (2013.01); *G06F 2203/04806* (2013.01)

(58) Field of Classification Search
    CPC .............. G06F 3/0482; G06F 3/04845; G06F 2203/04806; G06T 15/06
    See application file for complete search history.

(56) References Cited

U.S. PATENT DOCUMENTS

| | | |
|---|---|---|
| 6,476,805 B1 | 11/2002 | Shum et al. |
| 2012/0249550 A1 | 10/2012 | Akeley et al. |
| 2014/0354828 A1* | 12/2014 | Rubinstein ............ G06T 3/0068 348/187 |

FOREIGN PATENT DOCUMENTS

| | | |
|---|---|---|
| EP | 2930659 A1 | 10/2015 |
| WO | WO9849667 A2 | 11/1998 |

OTHER PUBLICATIONS

Extended European Search Report dated Oct. 6, 2017 in corresponding EP Application No. 17170638.5.
Rezk-Salama et al.: "Raycasting of Light Field Galleries from Volumetric Data"; Computer Graphics Forum; vol. 27; No. 3; pp. 839-846.
Chajdas, Matthaus G., et al. "Virtual Texture Mapping 101." GPU Pro: Advanced Rendering Techniques (2010): 185.

(Continued)

*Primary Examiner* — Huy T Nguyen

(57) ABSTRACT

The present embodiments relate to multi-resolution lightfield representations and lightfield renderings. By way of introduction, the present embodiments include apparatuses and methods for generating multi-resolution lightfield representations used to generate lightfield renderings that provide end users with zoom functionality without distorting the rendering. Image data sets of a volume are captured at different resolutions for each camera position, and the image data sets are stored as multi-resolution image pyramids. The multi-resolution image pyramids represent the lightfield at different resolutions, and image data sets at a particular resolution are selected and used for generating a volume rendering at a zoom level chosen for the lightfield rendering.

21 Claims, 10 Drawing Sheets

(56) References Cited

OTHER PUBLICATIONS

Gortler, Steven J., et al. "The lumigraph." Proceedings of the 23rd annual conference on Computer graphics and interactive techniques. ACM, 1996.
Krolla, Bernd, et al. "Spherical Light Fields." BMVC. 2014.
Levoy, Marc, and Pat Hanrahan. "Light field rendering." Proceedings of the 23rd annual conference on Computer graphics and interactive techniques. ACM, 1996.
Mavlankar, Aditya, and Bernd Girod. "Video streaming with interactive pan/tilt/zoom." High-Quality Visual Experience. Springer Berlin Heidelberg, 2010. 431-455.
Peter, Ingmar, and Wolfgang Straβer. "The wavelet stream: Interactive multi resolution light field rendering." Springer Vienna, 2001.
Ramanathan, Prashant, and Bernd Girod. "Random access for compressed light fields using multiple representations." Multimedia Signal Processing, 2004 IEEE 6th Workshop on. IEEE, 2004.
Ramanathan, Prashant, and Bernd Girod. "Rate-distortion optimized streaming of compressed light fields with multiple representations." Proc. Packet Video (PV) (2004).
Todt, Severin, et al. "Fast (spherical) light field rendering with per-pixel depth." Technical report, University of Siegen, Germany, 2007.

\* cited by examiner

MULTI-RESOLUTION LIGHTFIELD RENDERING USING IMAGE PYRAMIDS

BACKGROUND

Volume rendering often utilizes stochastic-based path tracing and requires many ray casting draw calls to achieve high visual fidelity free of artifacts. Due to processing limitations in modern graphics processing units (GPUs), real-time user interaction with a path tracing renderer may only generate and display incomplete images to the user with rendering artifacts. The rendering artifacts are described as high frequency noise or "salt and pepper," and are the result of the low number of ray casting draw calls used to generate and display the images to the user. In a medical imaging setting, the incomplete images may reduce a user's ability to diagnose and/or review patient data. Thus, due to the processing limitations, volume renderings from path tracing, such as Monte Carlo volume renderings, are often generated before viewing, or a-priori. The resulting images are saved to memory for future use. Generating volume renderings in this manner shifts the rendering process from real-time path tracing rendering to real-time image-based rendering.

One image-based rendering technique is lightfield or Lumigraph rendering. Lightfield rendering generates one or more virtual views from previously rendered or photographically captured images or image data. Lightfield rendering recreates detailed views of real scenes and renders volumes with very subtle interactions between light and matter. Lightfield representations are generated using a simplified plenoptic function. A plenoptic function describes the radiance for every position and orientation in a region of space. The plenoptic function includes three dimensions describing position and two dimensions describing orientation, resulting in a five-dimensional function. Using a plenoptic function, every possible view within a scene may be reconstructed and rendered by sampling the plenoptic function for each ray generated by the camera. The five-dimensional plenoptic function may be prohibitively large in practice, and generation of the plenoptic function is not possible within occluded spaces. Therefore, simplifying assumptions can be made to the plenoptic function. For example, the plenoptic function is sampled outside the bounding hull of the rendered volume. Additionally, empty space around the volume, such as air, is assumed to not attenuate the light. Using these assumptions, the radiance along a ray stays is constant, and the two dimensions describing orientation can be reduced by one, resulting in a more manageable four-dimensional function for the lightfield rendering.

Lightfield image-based rendering has several drawbacks. Lightfield rendering techniques often employ computationally-expensive rendering algorithms used to generate the lightfield rendering. Further, the data size of the lightfield representation component images may be prohibitively large, and may be too large for a device's main or GPU memory all at once, and may be too large for contemporary mobile devices. The component images of the lightfield representation are also captured and generated at a single resolution and with limited camera rotation and panning. Thus, the single resolution images prevent the end user from zooming in and out of the lightfield rendering without introducing image distortion, such as upsampling artifacts occurring from linear interpolation upsampling. Thus, a lightfield rendering is restricted to a small amount of user-interaction for zoom, rotation and panning.

SUMMARY

The present embodiments relate to multi-resolution lightfield representations and lightfield renderings. By way of introduction, the present embodiments described below include apparatuses and methods for generating multi-resolution lightfield representations used to generate lightfield renderings that provide end users with zoom or other interactive functionality without distorting the rendering. Image data sets of a volume are captured at different resolutions for each camera position, and the image data sets are stored as multi-resolution image pyramids. The multi-resolution image pyramids represent the lightfield at different resolutions, and image data sets at a particular resolution are selected and used for generating a volume rendering at a zoom level chosen for the lightfield rendering.

In a first aspect, a method for generating multi-resolution lightfield image pyramids is provided. The method includes receiving a plurality of image data sets of a volume at different resolutions for each of a plurality of different camera positions by an image processor. The volume represents an object or a patient. The image processor renders an image of the volume for each of the plurality of image data sets with each of the different resolutions corresponding to a level of a plurality of image pyramids. The server stores the rendered images for each of the different camera positions together as one of the plurality of lightfield image pyramids.

In a second aspect, a method for generating a lightfield volume rendering using multi-resolution lightfield image pyramids is provided. The method includes receiving a request for a lightfield volume rendering of a viewpoint of a volume by an image processor from a graphical user interface. The image processor identifies a position, an orientation and a zoom level for the lightfield volume rendering of the volume based on the requested viewpoint, receives a subset of images of the volume from a plurality of multi-resolution lightfield image pyramids corresponding to the identified position, the identified orientation and the identified zoom level from a server over a network and the lightfield volume rendering using the subset of images of the volume on a display.

In a third aspect, a system for generating a lightfield volume rendering using multi-resolution image pyramids is provided. The system includes a camera that is configured to capture a plurality of image data sets of a volume at different resolutions. The system also includes a server that is configured to render an image for each of the plurality of image data sets where each of the different resolutions corresponds to a level of a plurality of image pyramids and to store the rendered images for each of the different camera positions together as one of the plurality of image pyramids. The system also includes a workstation that is configured to identify an orientation and a zoom level for the lightfield volume rendering based on a requested viewpoint of the volume, to receive a subset of the rendered images from the plurality of image pyramids stored on the server that correspond to the identified orientation and the identified zoom level and to generate the lightfield volume rendering using the subset of images of the volume.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EXEMPLARY EMBODIMENTS

The present embodiments generate multi-resolution lightfield image representations (hereinafter, image pyramids), instead of single resolution images, for generating lightfield renderings. This multi-resolution approach captures multiple images at different resolutions for each camera position and generates multi-resolution lightfield image representations stored as image pyramids. The present embodiments also generate a lightfield rendering using the multi-resolution image pyramids. Multi-resolution image pyramids allow the end user to zoom in and out of the lightfield rendering without introducing image distortion, such as upsampling artifacts. The multi-resolution image pyramids and subsequent renderings utilize images at differing resolutions, instead of individual images captured at a single resolution.

Image pyramids are used in various lightfield techniques, such as light slab and spherical lightfields. The multi-resolution images stored in the image pyramids may optionally be divided and stored as image tiles. Dividing the image pyramids into tiles allows for efficient streaming of the images for rendering, only streaming the tiles necessary to generate the requested view during a lightfield rendering (e.g., in real-time).

Although the multi-resolution image pyramids may require more storage space than a single-resolution lightfield representation, the image pyramids allow the user to interactively zoom in and out of the lightfield rendering without loss in visual fidelity. The amount of zoom enabled by the image pyramids is correlated with the ratio of the dimensions and resolution of the different images, or levels, of the lightfield image pyramids. By using images of different resolutions, there is no or little loss in visual fidelity as the user zooms, thus the zooming feature provides functionality that is akin to optical zoom in traditional photography, rather than digital zoom using image up-sampling. The multi-resolution image pyramids also allow for interactive streaming to a workstation or mobile device in a client-server implementation, allowing the rendering devices to generate adaptive renderings in real-time.

Medical imaging facilitated by multi-resolution lightfield rendering may overcome limitations of real-time Monte Carlo path tracing and other computationally expensive rendering techniques. Thus, extremely high resolution image-based renderings of medical data may be generated in real-time. A physician may benefit from the additional information in making a diagnosis. Remote visualization of medical lightfield renderings may be provided, and may employ tile streaming from a server computer to another device, such as a remote workstation or mobile device. Lightfield renderings using image pyramids may also provide distortion-free zooming to non-medical imaging applications. For example, lightfield image pyramids may also be employed in applications of virtual and augmented reality, such as in virtual reality headsets.

Figure 1:
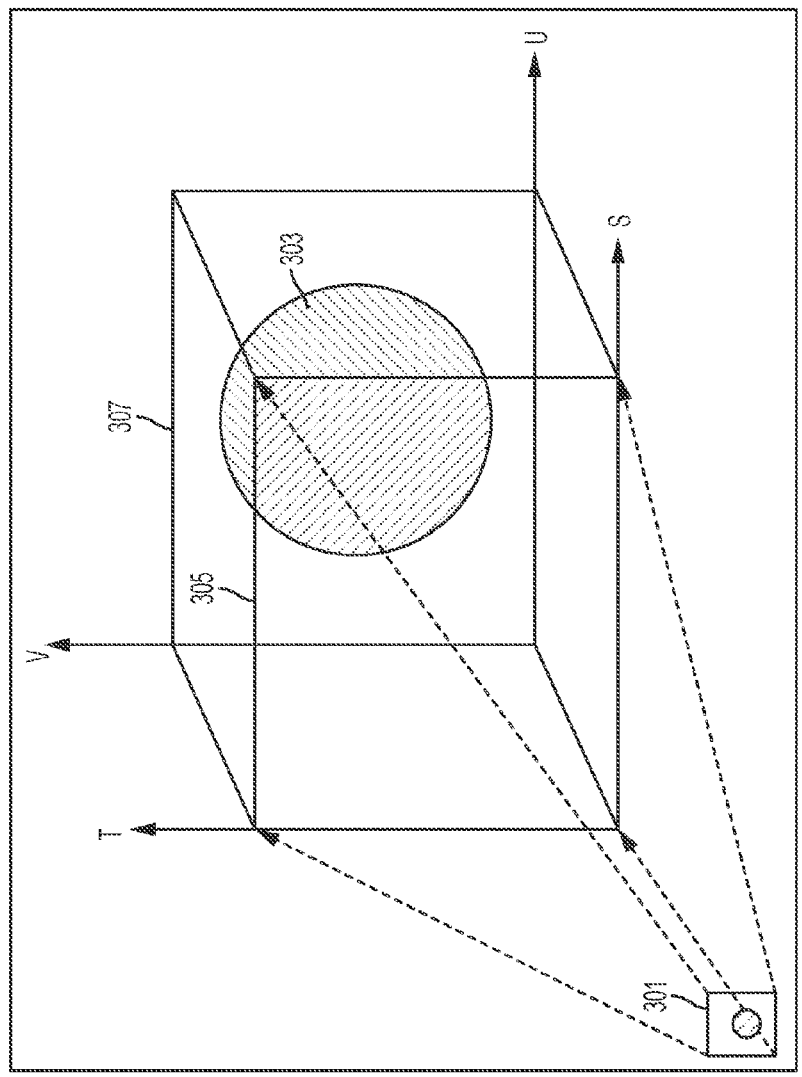
FIG. 1 illustrates an example of capturing a set of image data for a lightfield using a light slab technique.

FIG. 1 illustrates an example of capturing a set of image data using a light slab technique. Traditional lightfield rendering techniques utilize a lightfield representation with component images that are captured and rendered at a single-resolution. Irradiance is captured at a single resolution to generate each image used for the single-resolution lightfield representation. The single-resolution lightfield representation prevents the end user from being able to zoom in and out of the lightfield rendering without introducing image distortion and upsampling artifacts.

For example, referring to FIG. 1, one technique of parameterizing the lightfield representation is with a light slab technique. Two finite planes are introduced around the object of interest 303. The first plane 305 is defined by the vectors (s, t) and the second plane 307 is defined by the vectors (u, v). An image 301 is generated by capturing rays from each discretized position on the first plane 305 to each position on the second plane 307. Typically, a lightfield rendering may be restricted to a small amount of user interaction in the form of camera rotation and panning. Using six light slab renderings may allow for more freedom in user interaction, but may introduce distortion and other visual artifacts along the light slab borders. In order to capture the object from different sides, six light slabs are combined (e.g., six sides of a cube formed by six planes as described above). If the camera frustum lies within the defined planes, every possible view can be reconstructed.

Figure 2:
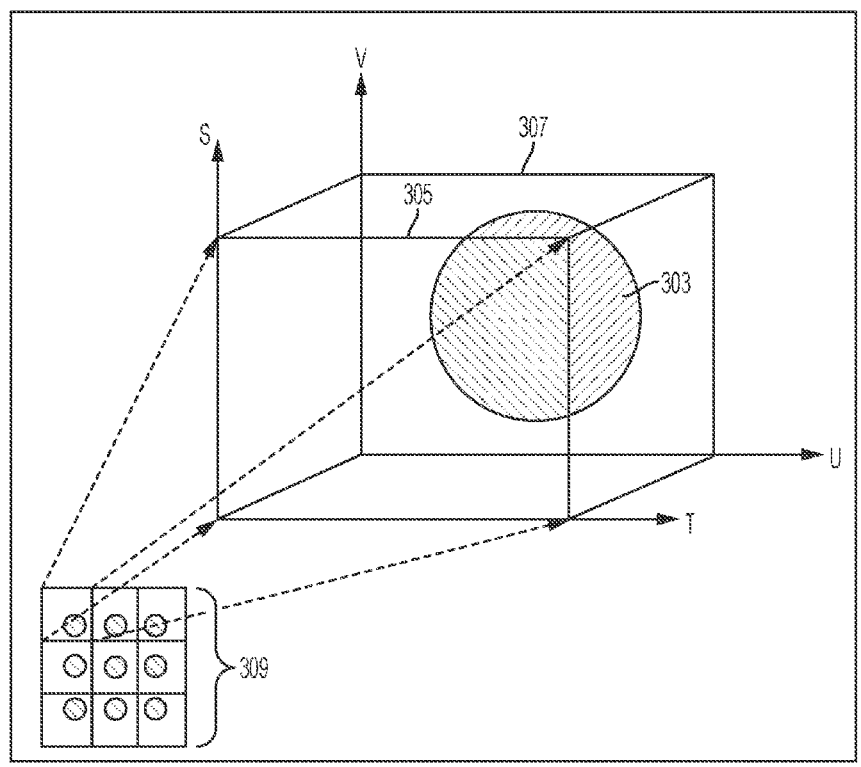
FIG. 2 illustrates an example of capturing multiple sets of image data for a lightfield using a light slab technique.

Multiple sets of image data may be captured for each camera position. For example, FIG. 2 illustrates an example of capturing multiple sets of image data using a light slab technique. As illustrated in FIG. 2, a grid of images including multiple images 309 may be captured for each camera position by jittering the camera position. Instead of generating a single image 301, multiple images 309 are generated using the first plane 305 and the second plane 307 using slightly different camera positions. The images 309 each capturing a slightly different position of the object of interest 303. The images 309 allow for additional freedom of user interaction and may reduce distortion and other visual artifacts along the light slab borders.

Figure 3:
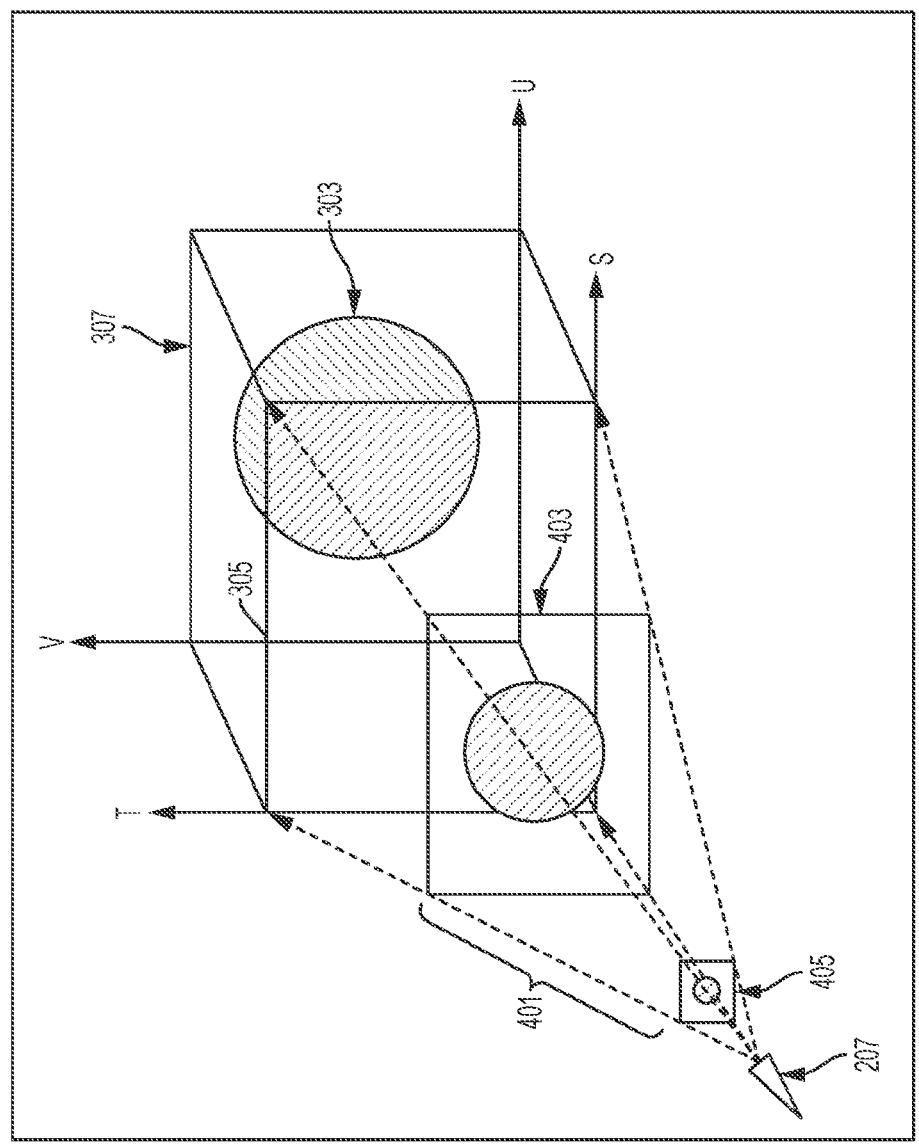
FIG. 3 illustrates an example of capturing a lightfield as an image using a light slab technique with different resolutions.

FIG. 3 illustrates an example of capturing a lightfield representation as an image pyramid using a light slab technique. For the light slab approach (as opposed to the spherical light field discussed below), the object of interest 303 is assumed to be aligned with the bounding geometry of the light slab defined by the first plane 305 and the second plane 307. The camera, synthetic camera or scanner 207 captures image data to generate an image pyramid 401. The image data sets may be captured and rendered at different resolutions. Alternatively, image data captured by a scanner may be used for rendering different resolutions using rendering techniques (e.g., synthetic camera). For example, a synthetic camera (e.g., rendering software) may be configured to render images from different viewpoints at different resolutions using image data. For example, a top level 405 is captured and rendered at a first resolution (e.g., 1 k by 1 k) and a bottom level 403 is captured and rendered at a second resolution (e.g., 16 k by 16 k). Various intermediate levels (not depicted in FIG. 3) are captured and rendered at resolutions greater than the top level 405 and less than the bottom level 403, (e.g., 4 k by 4 k). The image data sets are captured using computerized tomography (CT), magnetic resonance (MR) imaging, ultrasound, emission tomography, or another scanning modality. For example, the image data is captured as a collection of rays, and images of different resolutions are rendered from the image data for each of the different levels of the image pyramids. In an implementation, the component images for each of the levels of the image pyramid 401 are rendered using a cinematic volume renderer employing Monte Carlo rendering techniques. Other rendering techniques may also be employed.

Figure 4:
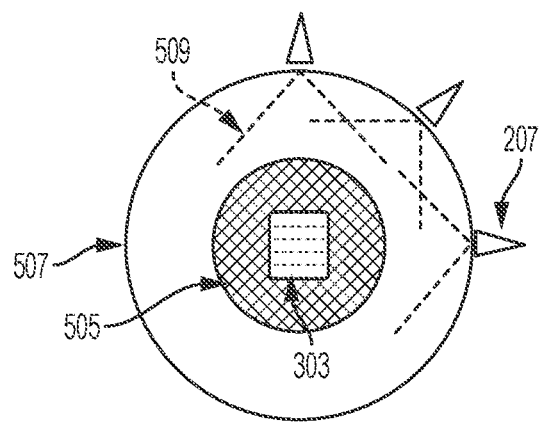
FIG. 4 illustrates an example of capturing image data for a lightfield using a spherical lightfield technique.

In addition to the light slab technique discussed above, other lightfield rendering techniques may be used. For example, FIG. 4 illustrates an example of capturing image data for a lightfield using a spherical lightfield technique. A spherical lightfield technique renders component images of an object of interest 303 in a three-dimensional spherical environment. A spherical lightfield rendering may allow a user to interactively navigate around the three-dimensional spherical environment by reconstructing each view around the enclosing spheres. However, as with traditional light slab based lightfield renderings, the spherical lightfield technique does not allow for zooming without introducing distortion or other image artifacts.

Figure 5:
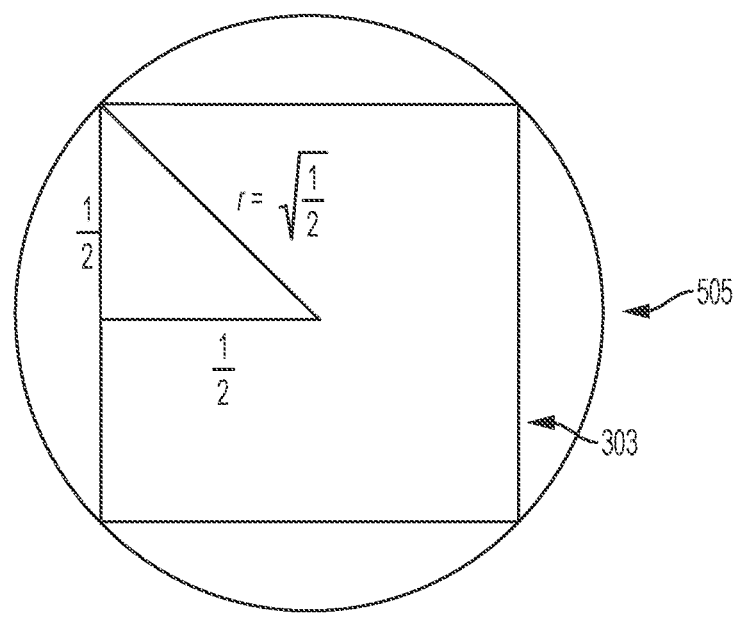
FIG. 5 illustrates an example of a medical volume represented by a unit cube for a spherical lightfield technique.

For example, the spherical technique parameterizes the lightfield representation using two enclosing spheres 505 and 507. An inner sphere 505 is defined around the object of interest 303. For example, the object of interest 303 may be medical volume, and FIG. 5 illustrates an example of a medical volume represented by a unit cube for a spherical lightfield technique. The medical volume is encapsulated and bounded by the inner sphere 505. For example, for a spherical lightfield representation of a medical volume, the volume may be enclosed by inner sphere 505 as tightly as possible. A larger sphere 507 is defined as encapsulating the inner sphere 505 and is centered at the same position as the inner sphere 505. The camera 207, or synthetic camera 207 (e.g., using image data captured by a scanner), captures image data sets for the spherical lightfield representation by moving the camera 207 about the outer sphere 507 and captures images of the inner sphere 505. In each position, the camera 207 is positioned outside of the inner sphere 505 of the object of interest 303. The spherical lightfield representation is generated by the light or radiance exiting the inner sphere 505 and striking the outer sphere 507 at each camera position. For example, overlapping images may be captured by overlapping the camera frustum 509 of the camera 207 in each position. The camera frustum 509 includes the entire inner sphere 505 at each camera position.

Figure 6:
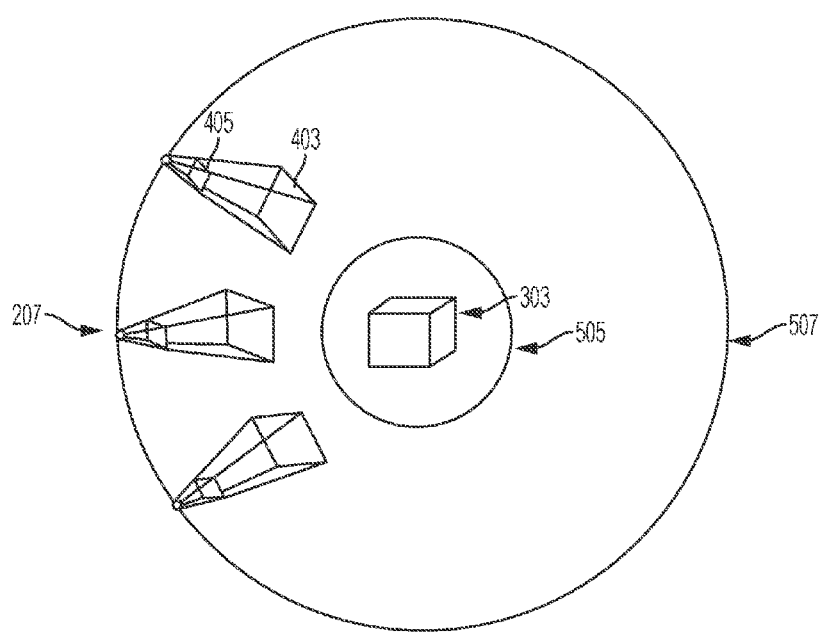
FIG. 6 illustrates an example of capturing a plurality of image pyramids using a spherical lightfield technique.

FIG. 6 illustrates an example of capturing a plurality of image pyramids using a spherical lightfield technique. As depicted in FIG. 6, the camera 207 is positioned at various positions about outer sphere 507, and an image pyramid is captured for each of the camera positions. For example, the camera 207 is positioned in uniformly distributed camera positions (additional camera positions are not depicted in FIG. 6). The camera positions may be at predefined locations that are uniformly distributed across the outer sphere 507. Irradiance is captured at each camera position. For example, irradiance is captured in rectangular image planes using Monte Carlo path tracing. In this example, it is assumed that the rectangular image planes have an infinitesimally small surface area (e.g., a point) that lies on the surface of the outer sphere 507 and the camera frustum 509 is oriented toward the center of the inner sphere 505. As discussed above with respect to the light slab technique, an image pyramid is generated for each camera position on the outer sphere 509. In an example, jittering is applied to the camera at each camera position. By applying jittering to the camera position, multiple image data sets are captured for the camera position. Using jittering, multiple image data sets may be used in generating an image pyramid for the camera position.

The spherical lightfield technique may be a more practical technique for medical volume rendering than the light slab technique. The spherical technique does not produce image distortion along the boundaries of the images as with the six light slabs.

Figures 7A, 7B:
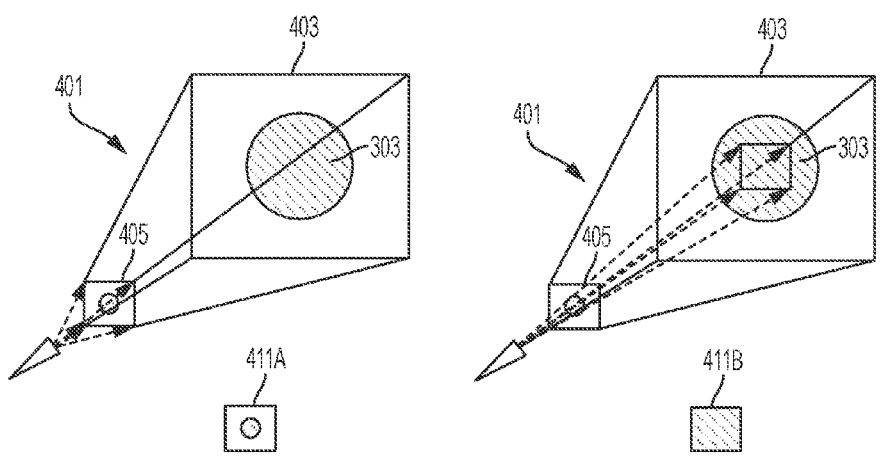
FIGS. 7A and 7B illustrate an example of generating an image-based lightfield rendering using an image pyramid.

FIGS. 7A and 7B illustrate an example of generating an image-based lightfield rendering using an image pyramid. FIG. 7A depicts a completely zoomed-out view generated by rendering the top level 405 of the image pyramid 401. For example, the rendered output 411A depicts the entire object of interest 303. FIG. 7B depicts a zoomed-in view generated by rendering the bottom level 403 of the image pyramid 401. For example, the rendered output 411B depicts a zoomed in view of a portion of the object of interest 303. During lightfield rendering, the view frustum provides zooming functionality with the rendering device accessing only the necessary image data from one of the different levels of the image pyramid 401 to render an image without distortion or other artifacts. The position of the camera in the zoomed-in view determines what part of the image data at a given resolution to select. FIGS. 7A and 7B have been simplified to depict only a single image pyramid, however image data from multiple image pyramids is used to generate a lightfield rendering. For example, image-based lightfield renderings are generated from ray samples from many images in order to render (e.g., reconstruct) a single output image. Multi-resolution lightfield renderings using image pyramids will similarly are generated from ray samples from many different image pyramids in order to render a single output image. Each of the source image pyramids are sampled at the same level of each pyramid (e.g., samples will all be taken from the bottom, top, or an intermediate level of every image pyramid) to generate the lightfield rendering.

Thus, by generating a lightfield rendering using image pyramids, the user can perform a zoom operation on the lightfield without introducing distortion in the rendered image. The amount of zoom may be restricted to predefined amounts, such as restricting the renderer from generating an image at a lower resolution than the resolution of the top level 405 of the image pyramid to avoid introducing upsampling distortion. For zooming to resolutions between levels of the image pyramids, the higher resolution image is used to avoid introducing upsampling distortion. The zoom functionality provided by the image pyramids may be utilized by various lightfield techniques, such as by light slab and spherical lightfield as discussed above. Further, interactive rendering may be enabled allowing the user to rotate, pan and zoom about the object of interest 303, such as a medical volume, rendering the object using the previously captured multi-resolution image pyramids.

Figure 8A:
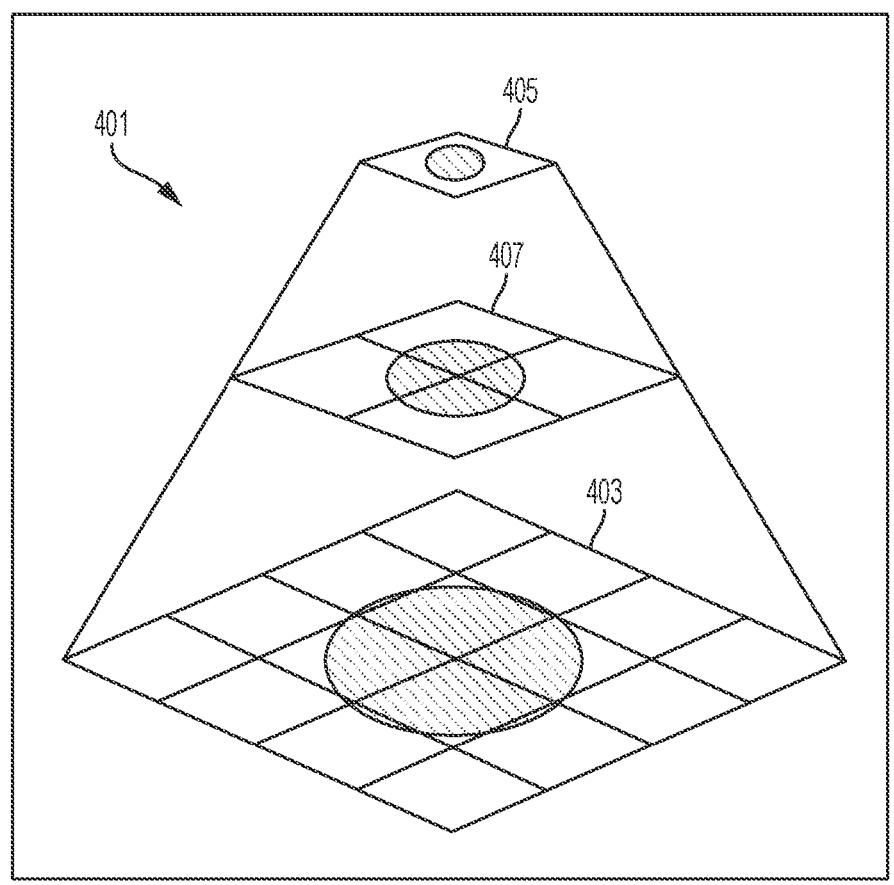
FIGS. 8A and 8B illustrates an example of an image pyramid divided into tiles.

The component images of the multi-resolution image pyramids may also be divided into smaller image tiles in order to support tile streaming of the image data to remote devices, such as remote workstations or mobile devices. For example, as depicted in FIG. 3, an image pyramid 401 may include a single image per level of the image pyramid 401. As discussed above, the upper level 405 includes an image captured at a smaller resolution than an image captured for the lower level 403. Alternatively, FIG. 8A illustrates an example of an image pyramid divided into image tiles. As depicted in FIG. 8A, the image pyramid 401 is divided into multiple image tiles per level of the image pyramid 401. For example, the upper level 405 includes a single image tile, the lower level 403 is divided into sixteen image tiles, and an intermediate level 407 is divided into four tiles. In this example, each image tile is the same size (number of pixels), such as the size and resolution of the upper level 405 (e.g., 1 k by 1 k). Storing a collection of image tiles for each level of the image pyramids, instead of one image per level of varying resolution, may reduce the memory requirements necessary to perform zoom functionality in the lightfield rendering. For example, dividing each level of the image pyramids into image tiles may be referred to as 'out-of-core' or sparse virtual texturing.

Further, each image tile in the image pyramids is assigned a unique ID number. After the image pyramids are generated (e.g., in a precomputation act), the lightfield rendering may be generated in real-time (e.g., in a rendering act). A camera position and view frustum (e.g., zoom amount) is determined, and based on the determination, the image tiles that are needed to perform the lightfield rendering are determined (e.g., generating and outputting a list of the tiles needed using the unique identifiers assigned to the image tiles). The image tiles necessary for the rendering are requested or fetched from a disk or memory, or streamed from a server in a remote rendering implementation, and are uploaded to the image processor (e.g., GPU). The image processor generates the lightfield rendering using only the image tiles necessary for the view based on the determined camera position and view frustum, lowering the amount of memory and computational expense necessary for rendering. For the spherical lightfield technique, an inverse distortion filter may also be applied when rendering the final image. For example, the inverse distortion filter is used to correct for distortion introduced by perspective projection rendering (e.g., when capturing a synthetic lightfield), or used to correct for the distortion introduced by the camera lens (e.g., when capturing a lightfield with a real camera and gantry). As discussed above, the image pyramids, optionally divided into tiles, may be stored on a different device than the rendering device, and only the images and/or tiles necessary for a particular rendered view are fetched from the storage device.

Figure 8B:
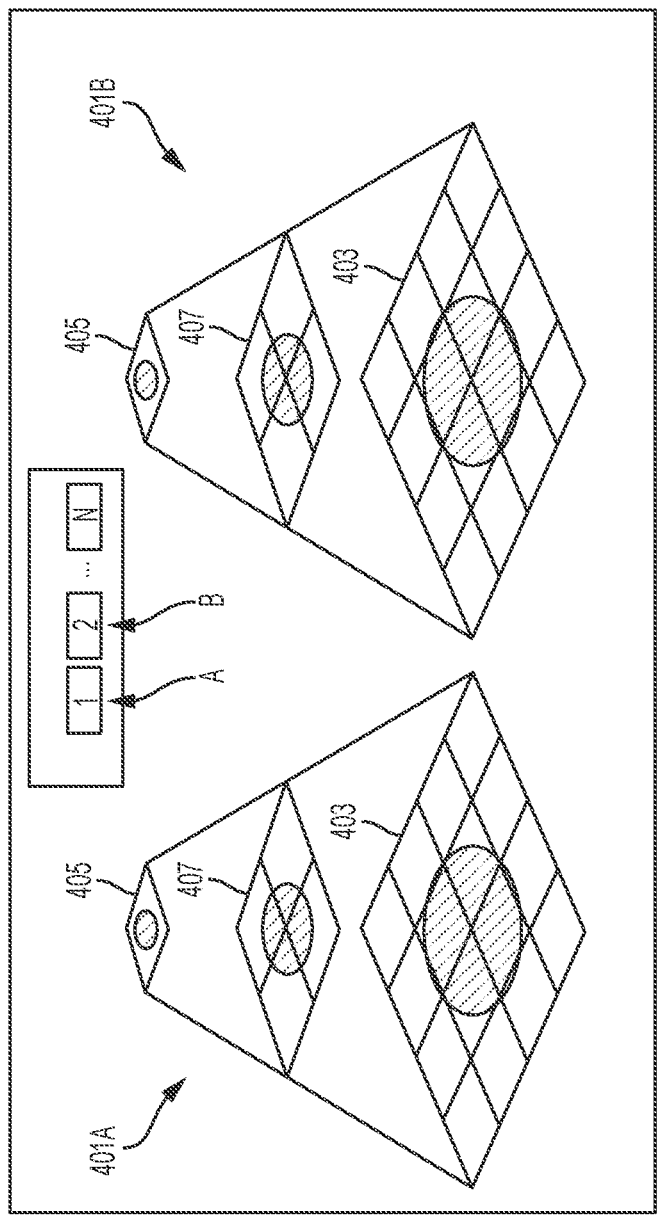

To further reduce the memory requirements and computation expense necessary to perform zoomable lightfield rendering, compression and/or encryption may be applied to images prior to transmitting the images to the rendering device. For example, streaming of lightfield representations may use SP frames of the h.264/AVC video codec and other techniques to overcome the predictive encoding of the h.264/AVC video codec. Alternatively, intra-encoding for each level of the image pyramid may be provided. For example, the images captured for each level of the image pyramid are inherently similar. Taking advantage of the similarity of the image data, extremely efficient compression may be applied to the data sets reducing the bandwidth required for transmitting the image data and the memory requirements for generating the lightfield rendering. For example, the individual tiles of neighboring image pyramids may be "correlated" for the purpose of encoding. As depicted in FIG. 8B, tile A from pyramid 401A is used as the first frame (e.g., source image) of a video encoding (e.g., such as h.264). Because tile B from pyramid 401B is visually similar to tile A from pyramid 401A (e.g., neighboring renderings), significant compression is achieved by using tile B from pyramid 401B as the second frame (e.g., source image) in the video encoding. In this way, a unique video encoding for each of the tile "locations'" of the pyramids is provided. It may be assumed that all image pyramids generated are exactly the same size in dimensions for every level of each image pyramid, and every image pyramid has the same number of levels. Thus all image pyramids are assumed to have the same number, size, and layout of tiles. Finally, instead of using wavelets to compress the image data, off-the-shelf image encoders may be used, such as JPEG for lossy compression or PNG for lossless compression. By not using h.264/AVC or other predictive encoding methods, decoder complexity may be reduced in the software implementation.

Figure 9:
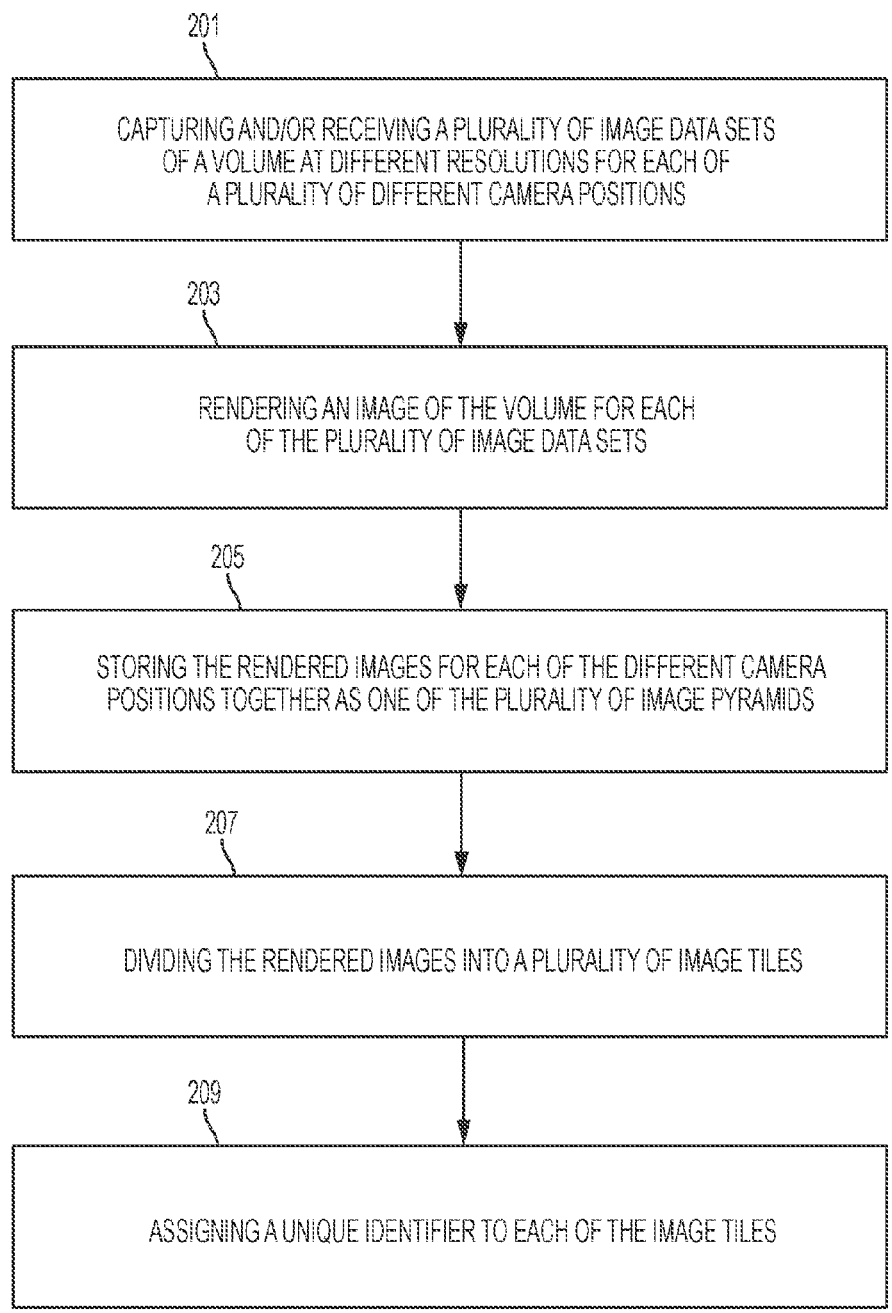
FIG. 9 illustrates a flowchart diagram of an embodiment of a method for generating multi-resolution lightfield image pyramids.

FIG. 9 illustrates a flowchart diagram of an embodiment of a method for generating multi-resolution lightfield image pyramids. The method is implemented by the system of FIG. 11 (discussed below) and/or a different system. Additional, different or fewer acts may be provided. For example, acts 207 and 209 may be omitted. The method is provided in the order shown. Other orders may be provided and/or acts may be repeated. For example, acts 201-209 may be repeated for each camera position. Further, the acts may be performed concurrently as parallel acts. For example, acts 203-209 may be performed concurrently. In an implementation, the method of FIG. 9 may be the first stage of a two-stage method. In the two-stage method, the first stage is a precomputation stage for generating the lightfield representation. The second stage is a lightfield rendering stage, as discussed below regarding the method of FIG. 10.

At act 201, a camera captures and/or an image processor receives a plurality of image data sets at different resolutions for each of a plurality of different camera positions. Jitter may be applied to the plurality of different camera positions to capture additional image data sets. The image data sets are captured using computerized tomography (CT), magnetic resonance (MR) imaging, ultrasound, emission tomography, or another scanning modality. In an implementation, Monte Carlo path tracing is used to generate the image data sets. For example, the image data sets include multi-dimensional image data including three-dimensional position data and at least one-dimensional orientation data. Alternatively, the image data sets include three-dimensional position data and two dimensions of orientation data. The multi-dimensional image data sets may be parameterized using various lightfield techniques. For example, the multi-dimensional image data sets may be parameterized with a plurality a light slabs. The plurality of light slabs are defined to include a first finite plane parallel to a second finite plane, and the volume lying between the first finite plane and the second plane. Path tracing is then performed from each point on the first finite plane to the second finite plane to parameterize the image data set. Alternatively, for example, the multi-dimensional image data sets may be parameterized with enclosing spheres. The enclosing spheres are defined to include a first sphere enclosing a second sphere, and with the volume enclosed by the second sphere. Path tracing is then performed from points on the first circle to each point on the second circle.

At act 203, the image processor renders an image of the volume for each of the plurality of image data sets. For example, each of the different resolutions corresponds to a level within each of the plurality of image pyramids (e.g., render images for levels 1, 2, . . . , N of each image pyramid). At act 205, the rendered images for each of the different camera positions are stored together by a server or other memory as one of the of image pyramids. An image for each level of the image pyramid is stored (e.g., store images for levels 1, 2, . . . , N).

At act 207, the image processor divides the rendered images into a plurality of image tiles. For example, higher resolution images are divided into more image tiles than lower resolution images. Each image divided into a set of tiles. However, division of the images in each image pyramid level is optional. At act 209, the image processor assigns a unique identifier to each of the image tiles. For example, a globally unique identifier, such as a combination of numbers and/or characters, is assigned to each image tile (if tiling is used). If image tiling is not used, a unique identifier may be assigned to each image of the image pyramids.

Figure 10:
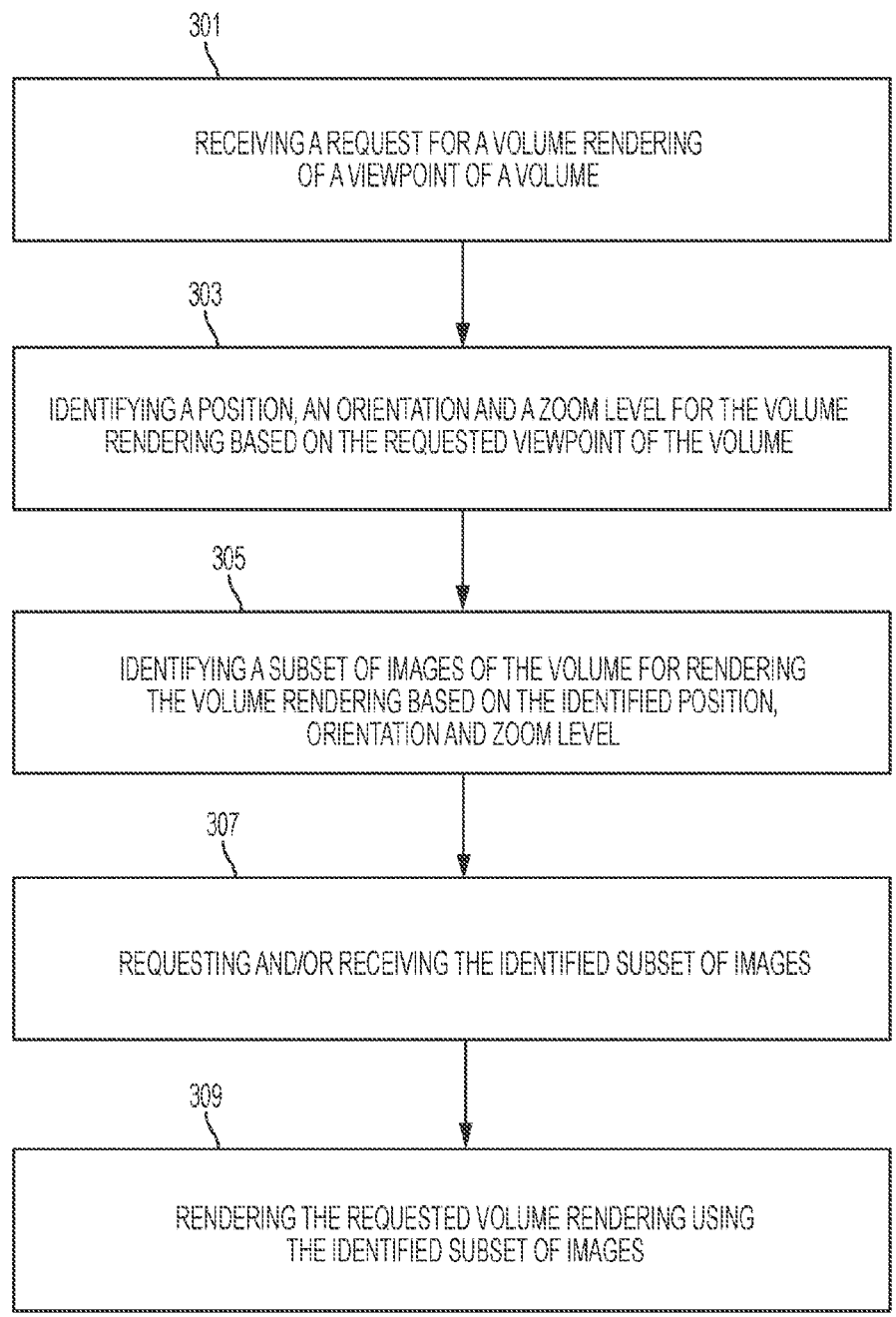
FIG. 10 illustrates a flowchart diagram of an embodiment of a method for generating a lightfield volume rendering using multi-resolution lightfield image pyramids.

FIG. 10 illustrates a flowchart diagram of an embodiment of a method for generating a lightfield volume rendering using multi-resolution lightfield image pyramids. The method is implemented by the system of FIG. 11 (discussed below) and/or a different system. Additional, different or fewer acts may be provided. For example, acts 307 and 309 may be omitted. The method is provided in the order shown. Other orders may be provided and/or acts may be repeated. For example, acts 301-309 may be repeated to for each user request. In an implementation, the method of FIG. 10 may be the second stage of a two-stage method. In the two-stage method, the second stage is a lightfield rendering stage.

At act 301, an image processor receives a user request for a lightfield volume rendering for a viewpoint of a volume from a graphical user interface. For example, the requested viewpoint may be the user's desired virtual camera position, orientation, and zoom level for reconstructing in the volume. Act 301 may be repeated as a user requests a different viewpoint using the graphical user interface. In an implementation, the user may interactively request to change the viewpoint of the volume by rotating, panning and/or zooming in or out of the volume. Any user input and/or interface may be used for altering the viewpoint.

At act 303, the image processor identifies a position, an orientation and a zoom level for the lightfield volume rendering based on the requested viewpoint. Act 303 may be repeated to identify a second or subsequent position, a second or subsequent orientation and/or a second or subsequent zoom level for the lightfield volume rendering.

At act 305, a subset of images of the volume are identified for rendering the volume rendering based on the identified position, orientation and zoom level. For example, the image processor may generate a list of all images or image tiles needed from various image pyramids to generate the volume rendering. For example, images of the same resolution (e.g., level) from one or more different image pyramids are used to generate the volume rendering. The list of the subset of images are identified by the unique identifier for each image tile or image from the plurality of lightfield image pyramids.

At act 307, the image processor requests and/or receives the subset of images from the server or other memory. For example, the request is based on a plurality of unique identifiers associated with the images or image tiles. The images or image tiles are received from the server or other member, and may be encoded by a compression or encryption algorithm. For example, the images or image tiles are received and decoded as JPG (lossy) or PNG (lossless) image files. If request for a different viewpoint is received, act 307 is repeated to request and/or receive a second or subsequent subsets of images.

At act 309, the image processor generates the lightfield volume rendering on a display using the subset of images of the volume. The relevant tiles or images received are used to reconstruct the rendered view of the scene using lightfield rendering techniques. For example, generating the lightfield volume rendering may include interactively generating the volume rendering by the image processor based on user inputs from the graphical user interface. In an interactive volume rendering, the lightfield volume rendering may rotate and zoom the viewpoint of the volume without distorting the rendered image.

Figure 11:
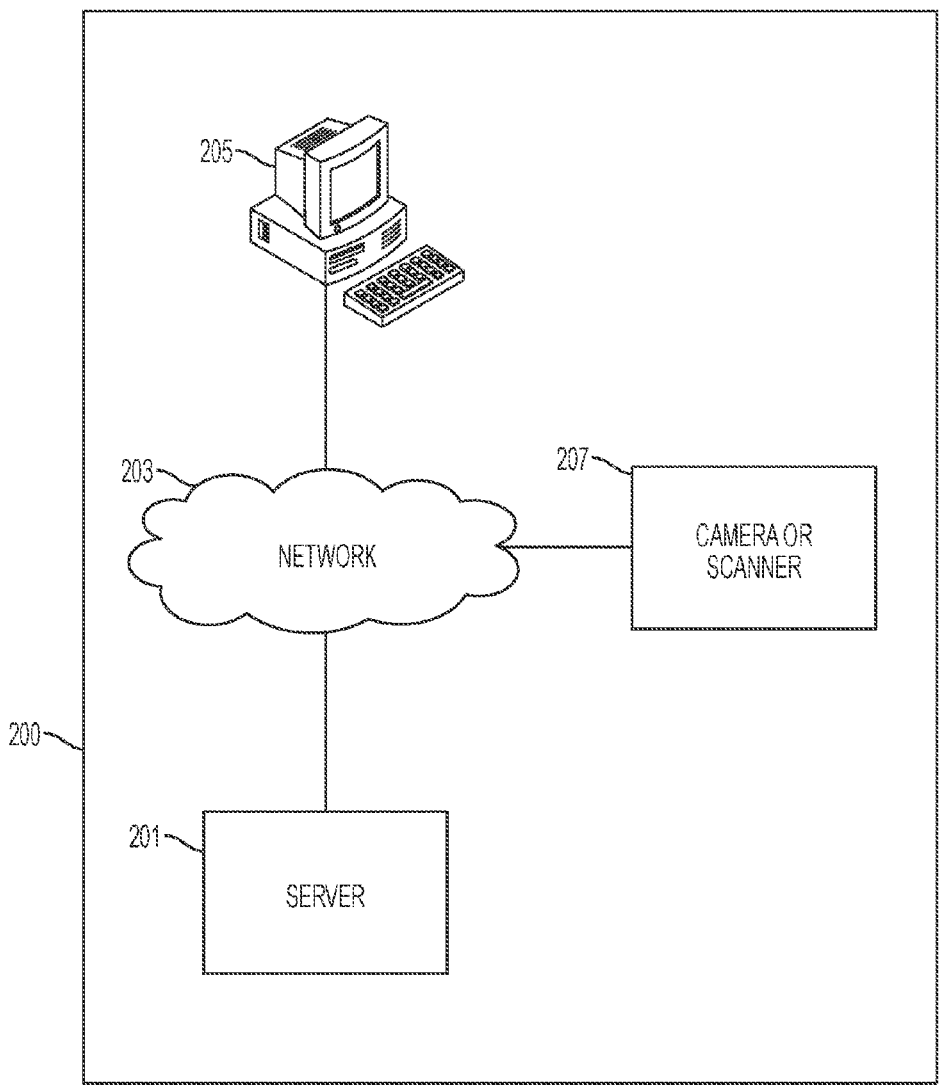
FIG. 11 illustrates an embodiment of a system for lightfield volume rendering using multi-resolution lightfield image pyramids.

FIG. 11 illustrates an embodiment of a system for lightfield volume rendering using multi-resolution lightfield image pyramids. The system 200, such as a medical system, includes a server 201, a network 203, a workstation 205 and a camera or scanner 207. Additional, different, or fewer components may be provided. For example, additional servers 201, networks 203, workstations 205 and/or cameras 207 are used. In another example, the servers 201 and the workstation 205 are directly connected, or implemented on a single computing device. In yet another example, the server 201, the workstation 205 and the camera 207 are implemented on a single scanning device. As another example, the workstation 205 is part of the camera 207. In yet another embodiment, the camera 207 performs the image capture and rendering without use of the network 203, server 201, or workstation 205.

The camera 207 is configured to capture a plurality of image data sets of a volume at different resolutions. Alternatively, the camera 207 may be configured as a synthetic camera (e.g., rendering software), using image data captured of a volume by a three-dimensional scanner, such as a computerized tomography (CT), ultrasound, x-ray, or magnetic resonance (MR) scanner. Other scanners and cameras may be used. The scanner 207 captures the plurality of image data sets, and lightfield image representations are generated using enclosing spheres, a plurality of light slabs or another technique. For example, the camera 207 is configured to capture an image data set for each of a plurality of different camera positions.

The network 203 is a wired or wireless network, or a combination thereof. Network 203 is configured as a local area network (LAN), wide area network (WAN), intranet, Internet or other now known or later developed network configurations. Any network or combination of networks for communicating between the client computer 205, the camera 207, the server 201 and other components may be used.

The server 201 is a server computer platform having hardware such as one or more central processing units (CPU), a system memory, a random access memory (RAM) and input/output (I/O) interface(s). The server 201 also includes a graphics processor unit (GPU) to accelerate image rendering. The server 201 is implemented on one or more server computers connected to network 203. Additional, different or fewer components may be provided.

The server 201 is configured to execute an application (e.g., an image processing module or image processing engine) to render an image for each of the image data sets at different resolutions, each of the different resolution images corresponding to different levels of a plurality of image pyramids. The server 201 is also configured to store the rendered images for each of the different camera positions together as one of the plurality of image pyramids. An image pyramid is stored for each of a plurality of camera positions. The server 201 is further configured to transmit the rendered images rendering to the workstation 205 over the network 203. In an embodiment, the server 201 includes image processor 209 and renderer 211. The image processor 209 and renderer 211 may be implemented in the same or separate hardware or devices. In another alternative, the image processor and/or renderer 211 may be part of the workstation 205 or the camera 207.

The workstation 205 is configured to execute an application to identify an orientation and a zoom level for the lightfield volume rendering of the volume based on a requested viewpoint. The workstation 205 is also configured to execute an application to receive a subset of the rendered images from the plurality of image pyramids stored on the server that correspond to the identified orientation and the identified zoom level. The workstation 205 is further configured to execute an application to generate a lightfield volume rendering using the subset of images of the volume. In an implementation, the workstation 205 is configured to execute an application to interactively render the volume rendering based on an input from the graphical user interface. For example, the graphical user interface may include one or more buttons, a keypad, a keyboard, a mouse, a stylist pen, a trackball, a rocker switch, a touch pad, voice recognition circuit, or another device or component for inputting data. In an example, pinch to zoom is used on a mobile device or workstation. In this implementation, the viewpoint of the lightfield volume rendering is rotated and zoomed without distorting the rendered image. In an embodiment, the workstation 205 performs the actions of the server 201, the image processor 209 and renderer 211.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

We claim:

1. A method for generating multi-resolution lightfield image pyramids, the method comprising:
    receiving, by an image processor, a plurality of image data sets of a volume at different resolutions for each of a plurality of different camera positions, wherein the volume represents an object or a patient;
    rendering, by the image processor, an image of the volume for each of the plurality of image data sets, wherein each of the different resolutions corresponds to a level of a plurality of image pyramids; and
    storing, by the server, the rendered images for each of the different camera positions together as one of the plurality of lightfield image pyramids.

2. The method of claim 1, wherein receiving the plurality of image data sets comprises receiving multi-dimensional image data sets.

3. The method of claim 2, wherein receiving the multi-dimensional image data sets comprises receiving three-dimensional position data and at least one-dimensional orientation data.

4. The method of claim 2, wherein receiving the multi-dimensional image data sets comprises receiving image data sets parameterized with a plurality a light slabs.

5. The method of claim 4, wherein parameterizing the image data sets comprises:
    defining the plurality of light slabs, each light slab comprising a first finite plane parallel to a second finite plane, wherein the volume lies between the first finite plane and the second plane; and
    ray tracing from each point on the first finite plane to the second finite plane.

6. The method of claim 2, wherein receiving the multi-dimensional image data sets comprises receiving image data sets parameterized with enclosing spheres.

7. The method of claim 1, wherein parameterizing the image data sets comprises:
    defining a first sphere and a second sphere inside the first sphere, wherein the volume lies inside the second sphere; and
    path tracing from points on the first circle from each point on the second circle.

8. The method of claim 1, further comprising:
    dividing, by the image processor, the rendered images into a plurality of image tiles; and
    assigning, by the image processor, a unique identifier to each of the image tiles.

9. The method of claim 8, wherein rendered images with higher resolutions are divided into more image tiles than rendered images with lower resolutions.

10. A system for generating a lightfield volume rendering using multi-resolution image pyramids, the system comprising:
    a camera configured to:
        capture a plurality of image data sets of a volume at different resolutions;
    a server configured to:
        render an image for each of the plurality of image data sets, wherein each of the different resolutions corresponds to a level of a plurality of image pyramids; and
        store the rendered images for each of the different camera positions together as one of the plurality of image pyramids; and
    a workstation configured to:
        identify an orientation and a zoom level for the lightfield volume rendering based on a requested viewpoint of the volume;
        receive a subset of the rendered images from the plurality of image pyramids stored on the server that correspond to the identified orientation and the identified zoom level; and
        generate the lightfield volume rendering using the subset of images of the volume.

11. The system of claim 10, the camera is configured to capture the plurality of image data sets using enclosing spheres.

12. The system of claim 11, wherein the workstation is further configured to interactively rotate and zoom the volume rendering without distortion.

13. The system of claim 10, wherein the workstation is further configured to:
    receive a second requested viewpoint, the second requested viewpoint comprising an increased zoom level;
    identify a second orientation and the increased zoom level for the lightfield volume rendering based on the second requested viewpoint;

receive a second subset of the rendered images from the plurality of image pyramids stored on the server that correspond to the second identified orientation and the increased zoom level; and generate a second lightfield volume rendering using the second subset of images of the volume.

14. The system of claim 10, wherein the second lightfield volume rendering is displayed without distortion caused by the increased zoom level.

15. The system of claim 10, wherein the camera is configured to capture the plurality of image data sets using a plurality of light slabs.

16. The system of claim 10, wherein the camera is configured to capture an image data set for each of a plurality of different camera positions for each of the plurality of light slabs.

17. A method for generating a lightfield volume rendering using multi-resolution lightfield image pyramids, the method comprising:

receiving, by a graphical user interface, a request for a lightfield volume rendering of a viewpoint of a volume;

identifying, by the image processor, a position, an orientation and a zoom level for the lightfield volume rendering of the volume based on the requested viewpoint;

receiving, by the image processor, a subset of images of the volume from a plurality of multi-resolution lightfield image pyramids corresponding to the identified position, the identified orientation and the identified zoom level; and generating, by the image processor on a display, the lightfield volume rendering using the subset of images of the volume.

18. The method of claim 17, further comprising:
generating, by the image processor, a list of the subset of images of the volume for rendering the lightfield volume rendering, wherein the images of the volume comprise image tiles from the plurality of lightfield image pyramids.

19. The method of claim 17, further comprising:
requesting, by the image processor from the server, the subset of images of the volume based on a plurality of unique identifiers associated with the image tiles.

20. The method of claim 17, further comprising:
receiving, by the image processor from a graphical user interface, a request to change the viewpoint of the volume;

identifying, by the image processor, a second position, a second orientation or a second zoom level of the lightfield volume rendering;

receiving, by the image processor from the server over the network, a second subset of images of the volume from the plurality of multi-resolution lightfield image pyramids corresponding to the identified second position, the identified second orientation and the identified second zoom level; and generating, by the image processor on a display, a second lightfield volume rendering using the second subset of images of the volume.

21. The method of claim 17, wherein generating the lightfield volume rendering comprises interactively generating, by the image processor based on an input from the graphical user interface, the lightfield volume rendering to rotate and zoom the viewpoint of the volume without distorting the lightfield volume rendering.

* * * * *